United States Patent
Murphy et al.

(10) Patent No.: US 9,891,438 B2
(45) Date of Patent: Feb. 13, 2018

(54) SYSTEM AND METHOD FOR PROCESSING A VIDEO SIGNAL WITH REDUCED LATENCY

(71) Applicant: Freedom Scientific, Inc., St. Petersburg, FL (US)

(72) Inventors: Patrick Murphy, Riverview, FL (US); Todd Conard, Ruskin, FL (US); Douglas J. Glazar, Parrish, FL (US)

(73) Assignee: Freedom Scientific, Inc., St. Petersburg, FL (US)

( * ) Notice: Subject to any disclaimer, the term of this patent is extended or adjusted under 35 U.S.C. 154(b) by 166 days.

(21) Appl. No.: 14/701,075

(22) Filed: Apr. 30, 2015

(65) Prior Publication Data

US 2015/0316774 A1    Nov. 5, 2015

Related U.S. Application Data

(60) Provisional application No. 61/986,622, filed on Apr. 30, 2014.

(51) Int. Cl.
*H04N 7/18* (2006.01)
*G02B 27/02* (2006.01)
(Continued)

(52) U.S. Cl.
CPC ......... *G02B 27/026* (2013.01); *G02B 27/021* (2013.01); *G02B 27/027* (2013.01);
(Continued)

(58) Field of Classification Search
CPC .. G02B 27/026; G02B 27/021; G02B 27/027; G06T 7/507; G06T 7/70; G06T 7/11; G06T 3/0025; G06T 3/4015; G06T 3/602; G06T 1/0007; G06T 2207/20208; G06T 2207/10024; G06T 2207/30176; G06T 2207/20021; G06T 2207/10152; G06T 2207/10016; H04N 5/247; H04N 5/77; H04N 5/2354; H04N 9/825; H04N 9/7936; H04N 2201/0436; H04N 2201/0081; H04N 2201/043; H04N 2201/0089; G09G 5/026; G09G 5/04; G09G 5/14; G09G 5/391
(Continued)

(56) References Cited

U.S. PATENT DOCUMENTS 8,238,679 B1    8/2012   Rudin et al.
2002/0158815 A1  10/2002  Zwern
(Continued)

FOREIGN PATENT DOCUMENTS

CA    2838049 A1    4/2014
EP    1056071 A1    11/2000
(Continued)

*Primary Examiner* — Allen Wong
(74) *Attorney, Agent, or Firm* — GrayRobinson, P.A.; Michael J. Colitz, III

(57) ABSTRACT

Disclosed is a video processor for a magnifier camera. In particular, the disclosure relates to a video processor that eliminates the use of a frame buffer. This, in turn, reduces the latency otherwise present in the video signal. The disclosed video processor also allows selected portions of the display to be shaded. This highlights the non-shaded portions of the display while at the same time allowing the entire object to be perceived by the user.

7 Claims, 6 Drawing Sheets

(51) Int. Cl.

| | | |
|---|---|---|
| *H04N 5/235* | (2006.01) | |
| *H04N 5/247* | (2006.01) | |
| *H04N 9/825* | (2006.01) | |
| *H04N 9/793* | (2006.01) | |
| *G06T 1/00* | (2006.01) | |
| *G06T 3/40* | (2006.01) | |
| *G06T 3/60* | (2006.01) | |
| *H04N 5/77* | (2006.01) | |
| *G06T 3/00* | (2006.01) | |
| *G09G 5/02* | (2006.01) | |
| *G09G 5/04* | (2006.01) | |
| *G09G 5/14* | (2006.01) | |
| *G09G 5/391* | (2006.01) | |
| *G06T 7/70* | (2017.01) | |
| *G06T 7/507* | (2017.01) | |
| *G06T 7/11* | (2017.01) | |

(52) U.S. Cl.
CPC .......... *G06T 1/0007* (2013.01); *G06T 3/0025* (2013.01); *G06T 3/4015* (2013.01); *G06T 3/602* (2013.01); *G06T 7/11* (2017.01); *G06T 7/507* (2017.01); *G06T 7/70* (2017.01); *G09G 5/026* (2013.01); *G09G 5/04* (2013.01); *G09G 5/14* (2013.01); *G09G 5/391* (2013.01); *H04N 5/2354* (2013.01); *H04N 5/247* (2013.01); *H04N 5/77* (2013.01); *H04N 9/7936* (2013.01); *H04N 9/825* (2013.01); *G06T 2207/10016* (2013.01); *G06T 2207/10024* (2013.01); *G06T 2207/10152* (2013.01); *G06T 2207/20021* (2013.01); *G06T 2207/20208* (2013.01); *G06T 2207/30176* (2013.01); *H04N 2201/0081* (2013.01); *H04N 2201/0089* (2013.01); *H04N 2201/043* (2013.01); *H04N 2201/0436* (2013.01)

(58) Field of Classification Search
USPC .......................................... 348/63
See application file for complete search history.

(56) References Cited

U.S. PATENT DOCUMENTS

| | | |
|---|---|---|
| 2003/0103238 A1 | 6/2003 | MacLean et al. |
| 2005/0058360 A1 | 3/2005 | Berkey et al. |
| 2005/0288932 A1 | 12/2005 | Kurzweil et al. |
| 2006/0165154 A1 | 7/2006 | Usui |
| 2007/0195096 A1* | 8/2007 | Voorhees ............. G06F 3/0481 345/467 |
| 2010/0302148 A1 | 12/2010 | Tanabe et al. |
| 2011/0299772 A1* | 12/2011 | Janssen ................. G06T 5/002 382/167 |
| 2013/0113903 A1* | 5/2013 | Lazaridis ........... H04N 1/00307 348/63 |
| 2013/0329114 A1 | 12/2013 | Kim et al. |
| 2015/0215499 A1 | 7/2015 | Goldenberg et al. |

FOREIGN PATENT DOCUMENTS

| | | |
|---|---|---|
| GB | 2472307 A | 2/2011 |
| WO | 2013068584 A1 | 5/2013 |

* cited by examiner

SYSTEM AND METHOD FOR PROCESSING A VIDEO SIGNAL WITH REDUCED LATENCY

TECHNICAL FIELD

This disclosure relates to a video magnifier. The present disclosure also relates to a means of processing a video signal to reduce latency. Also disclosed is a means of video processing whereby shading can be applied to de-emphasize selected portions of the viewing area within the monitor.

BACKGROUND OF THE INVENTION

Video magnifiers are important tools for individuals who are blind or have low vision (i.e. "BLV users"). The construction typically includes an arm mounted camera and an associated monitor. The arm allows the camera to be directly positioned over the object being viewed. The object may be, for example, a prescription pill bottle or a newspaper or book. The arm is usually adjustable to permit the camera to focus upon a particular portion of the object or document. BLV users can then select a desired level of magnification so that the object, and any associated text, can be sufficiently enlarged for viewing and reading. Color contrasting and image rotation can be provided to further ease viewing. An X-Y table can optionally be positioned beneath the camera to allow for precise movements to the object being viewed. A video processor and look up tables are used to process the video signal generated by the camera. The video signal can be processed to make changes to one or more of the following: image scale; image position; color contrast; as well as other image features.

For all of these reasons, video magnifiers have become an indispensable tool to members of the BLV community. Nonetheless, traditional video magnifiers still suffer from some shortcomings. One of these shortcomings is latency. Latency refers to the slight delay that results from the video signal being processed. This delay is usually measured in milliseconds and occurs between the image being captured by the camera and its subsequent display upon the monitor. The use of frame buffers generally increases latency. Frame buffers are memory stores that contain a bitmap of an entire frame of data. Frame buffers allow the video frame to be scaled and otherwise allows desired attributes to be applied to the frame. The latency that results from frame buffering is largely unnoticeable in most applications. However, latency is highly problematic in the context of a video magnifier, as BLV users will notice a lag between the manipulation an object and its subsequent appearance on the video monitor. This lag greatly complicates the manual tasks performed by BLV users.

Video magnifiers also employ techniques to help focus the user's vision upon the screen. For this reason, traditional video magnifiers sometimes black out regions of the screen. The blacked out regions tend to highlight the non-blacked out regions. This allows the BLV user to focus upon one area of an object. In the case of text, it allows the BLV user to read one line of text at a time. The underlying text may be scrolled so that sequential lines are presented to the user. Although this technique is beneficial, it has some drawbacks. By blacking out regions of text, the BLV user often loses their place within the document. It also makes it difficult for the user to navigate around an object and through lengthy text.

Various video processing techniques are known in the prior art. Some of these techniques discuss reducing latency. For example, WO2013/068584 to Eaturnus discloses a ultra-low latency video communication system. This system employs a transmission unit with image acquiring circuitry or image reconstruction circuitry for acquiring or reconstructing an image frame or an image field. A video processing unit is also included for processing at least part of the video data. Also included is a communication unit for sending or receiving at least part of the video data.

Similarly, US Pub 2005/0288932 to Kurzweil discloses a system for reducing processing latency in optical character recognition for a portable reading device. The portable reading device may include a computing device with a computer readable medium for storing a computer program to receive an image and select a portion of the image to process. The device then processes the selection of the image with a first process, and when the first process is finished, a second process is initiated. While the second processing, the first process is repeated on another section of the image.

US Pub 2013/0329114 to Kim discloses an image magnifier with point control. The method allows for image control using magnification. The method comprises selecting a portion of the image, and then magnifying the selected portion. An action is then performed on the magnified and selected portion of the frame. The change may involve changing a feature of the selected portion.

Although these inventions achieve their own unique individual objectives, all suffer from drawbacks. For example, none of the prior art sufficiently eliminates the problems associated with latency. Likewise, none of the prior art allows shading to be applied to selected portions of a document in a manner suitable by low vision users.

What is needed, therefore, is a desktop video magnifier camera includes a pass through signal processor that eliminates the use of frame buffers and that greatly reduces associated latency. The video magnifier of the present disclosure is designed to fulfill this and other shortcomings present with existing video magnifiers.

What is also needed is a magnifier camera that allows portions of an object to be viewable but shaded. This would allow select portions of an object or text to be highlighted while at the same time allowing the remainder of the object or text to be perceived. The video magnifier of the present disclosure is designed to fulfill this and other shortcomings present with existing video magnifiers.

SUMMARY OF THE INVENTION

This disclosure relates to a video magnifier with low latency.

The disclosed video magnifier has several important advantages. For example, by eliminating the frame buffer, any noticeable delay in signal processing can be avoided.

Another advantage is achieved by utilizing a pass through video processor that allows users to view objects in near real time, which is especially important when the objects are being manipulated by BLV users.

A further advantage is realized by processing the video signal so that selected portions of the screen are shaded to thereby highlight the non-shaded portions.

Yet another advantage is realized by allowing certain portions of an object or text to be highlighted while at the same time allowing the user to perceive the remaining portions of the document.

Various embodiments of the invention may have none, some, or all of these advantages. Other technical advantages of the present invention will be readily apparent to one skilled in the art.

BRIEF DESCRIPTION OF THE DRAWINGS

For a more complete understanding of the present disclosure and its advantages, reference is now made to the following descriptions, taken in conjunction with the accompanying drawings, in which.

Similar reference numerals refer to similar parts throughout the several views of the drawings.

DETAILED DESCRIPTION OF THE DRAWINGS

This disclosure relates to a video processor for a magnifier camera. In particular, the disclosure relates to a video processor that eliminates the use of a frame buffer. This, in turn, reduces the latency otherwise present in the video signal. The disclosed video processor also allows selected portions of the display to be shaded. This highlights the non-shaded portions of the display while at the same time allowing the entire display to be perceived by the user. The various components of the present invention, and the manner in which they interrelate, are described in greater detail hereinafter.

Figure 1:
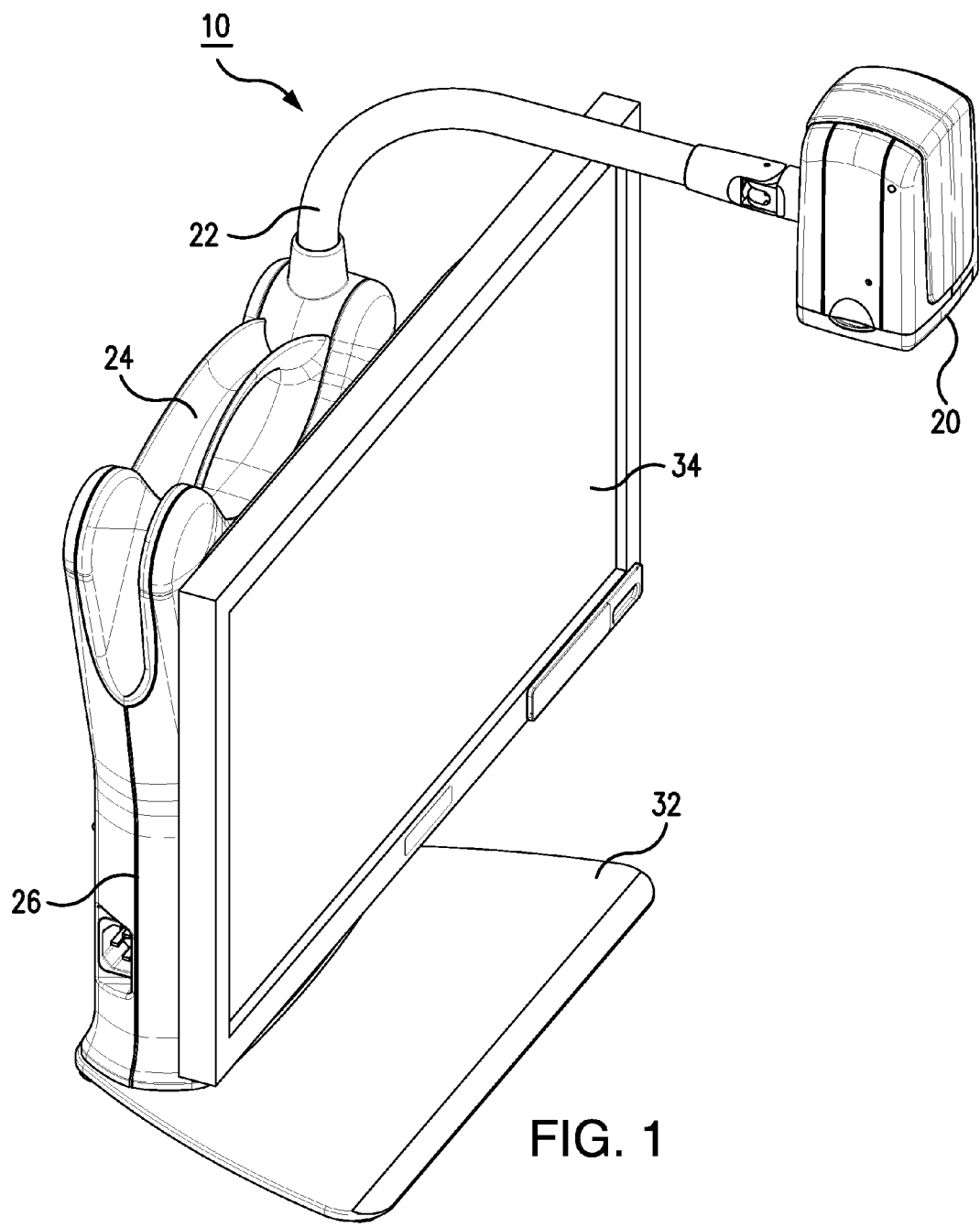
FIG. 1 is a perspective view of the magnifier of the present disclosure.

FIG. 1 illustrates a desktop video magnifier 10 that is constructed accordance with the present disclosure. The particular magnifier depicted is more fully described in co-pending application Ser. No. 14/607,197 filed on Jan. 28, 2015 and entitled "Video Magnifier Camera with Handle." The contents of this commonly owned application are fully incorporated herein for all purposes. Video magnifier 10 includes a high definition camera 20 that is mounted upon a camera arm 22. Camera arm 22 is flexible. Arm 22 can also swivel about a vertical axis and pivot about one or more horizontal axes to allow the user to properly position camera 20 over the object to be viewed. In one embodiment, arm 22 is dimensioned to be received within a trough 24 on the back of the device housing 26. Objects to be viewed can be placed directly beneath camera 20. Alternatively, an x-y table can be included beneath camera 20 to allow objects to be precisely oriented.

Figure 2:
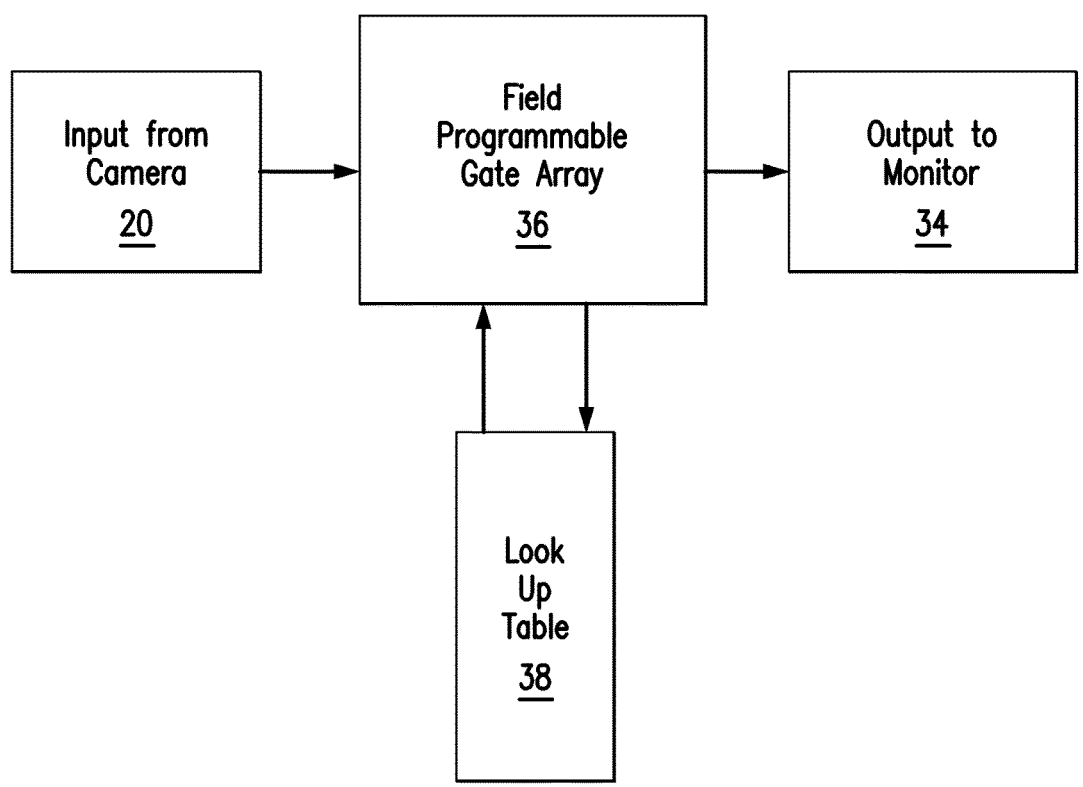
FIG. 2 is a schematic of the video processor used in connection with the present disclosure.
Figure 4:
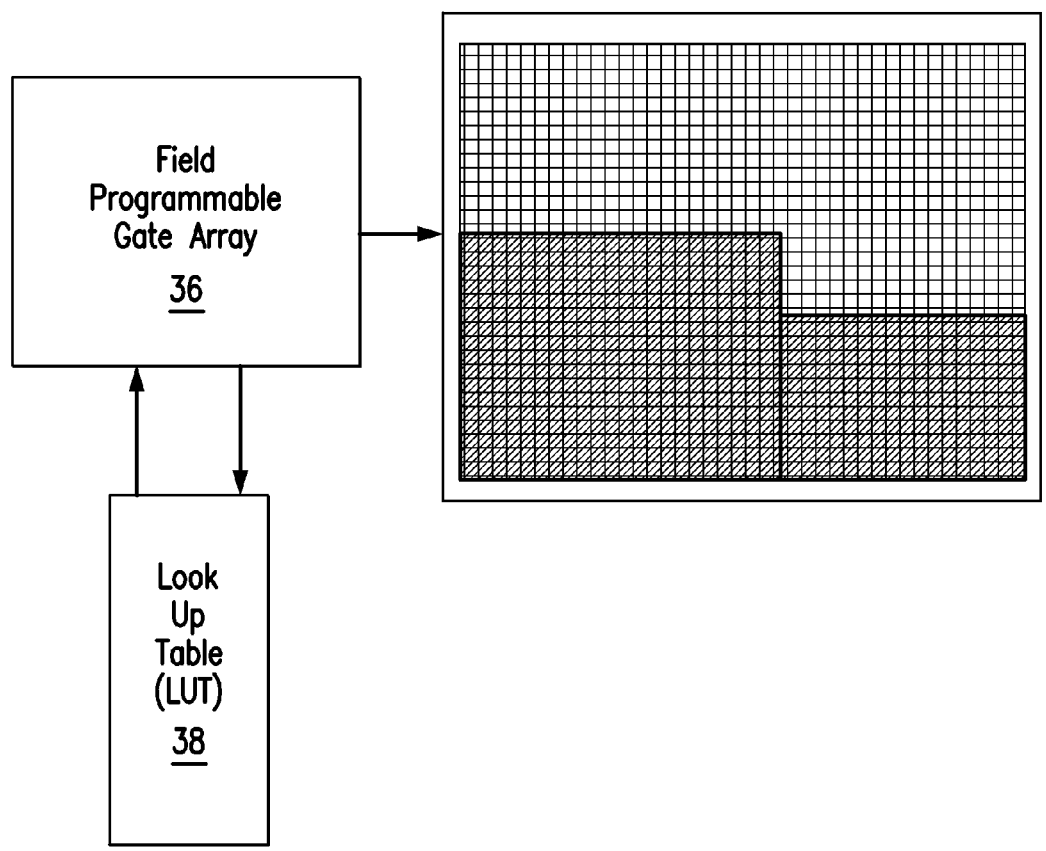
FIG. 4 illustrates the pixel by pixel signal processing of the present disclosure.

Magnifier 10 is supported by a base 32. Base 32, in turn, supports a video monitor 34 that is coupled to camera 20 via a cable, such as a VGA or HDMI cable. Signals generated by camera 20 are processed via a video processor 36 and displayed on monitor 34 for viewing by the operator. FIG. 2 illustrates processor 36, which is preferably a Field Programmable Gate Array ("FGPA"), and an associated look up table 38 ("LUT"). LUT 38 assigns output values based upon the input signal. In accordance with the invention, the input signal is processed on a pixel-by-pixel basis as opposed to a frame-by-frame basis. Processing the signal on a pixel-by-pixel basis eliminates the need for a frame buffer. Rather than storage large amounts of data in a memory buffer, processor 36 and LUT 38 can process each individual pixel of the recorded image. This "pass through" processing increases processing times and greatly reduces associated latency. The pixel-by-pixel processing is diagrammatically illustrated in FIG. 4. In order to accomplish this, the camera resolution is matched to the monitor resolution.

Processor 36 and LUT 38 can apply any of a number of different characteristics to the displayed image. In one example, the color scheme of the displayed image is altered. For example, images can be displayed in contrasting colors, such as blue/green, red/yellow or black/white. The user may cycle through the various color combinations to find the most effective output.

Figure 3:
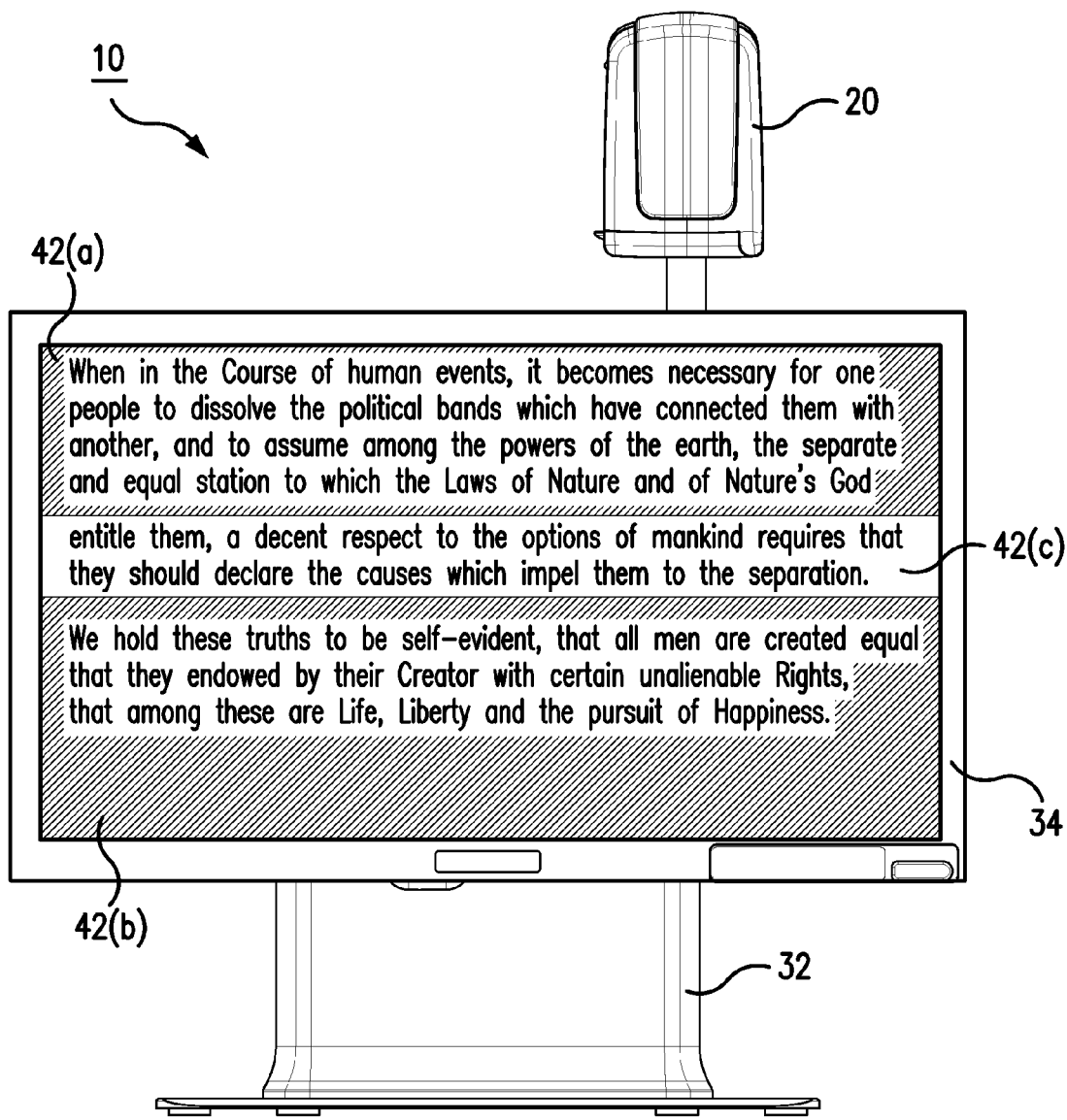
FIG. 3 is a front elevational view showing shading for use by blind or low vision users.

Alternatively, the video signal can be processed to highlight a desired region or regions of the displayed video. This feature of the invention is depicted in FIG. 3. As illustrated, text is being highlighted on the display by shading upper and lower portions (42a and 42b) of the text. This has the desired effect of highlighting the non-shaded portion 42(c). The degree of shading can be varied depending upon the needs of the particular user. It has been found that such shading is beneficial to BLV users suffering from conditions such as retinitis pigmentosa. The shading, however, is preferably not so great so as to completely mask or block out the underling words or images. This prevents the user from losing track of their place within the text. It likewise prevents a user from losing their orientation in an underlying image. The degree of shading and the orientation and positioning of the shading can be selected by the user. For example, the shading can be orientated to highlight a vertical, as opposed to horizontal, portion of the image.

In addition to helping focus upon a particular area, the shading also reduces the amount of light entering the user's eyes. This, in turn, reduces eye strain and lessens the pain associated with some low-vision disabilities. Thus, the semi-transparent shades reduce light from the monitor without limiting the viewable area available to the user.

Figure 5:
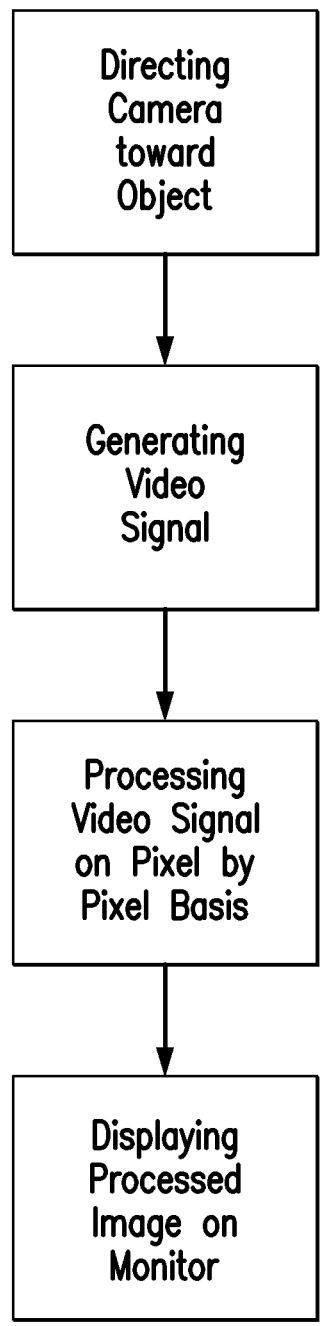
FIG. 5 is a flow chart illustrating some of the steps associated with the present disclosure.
Figure 6:
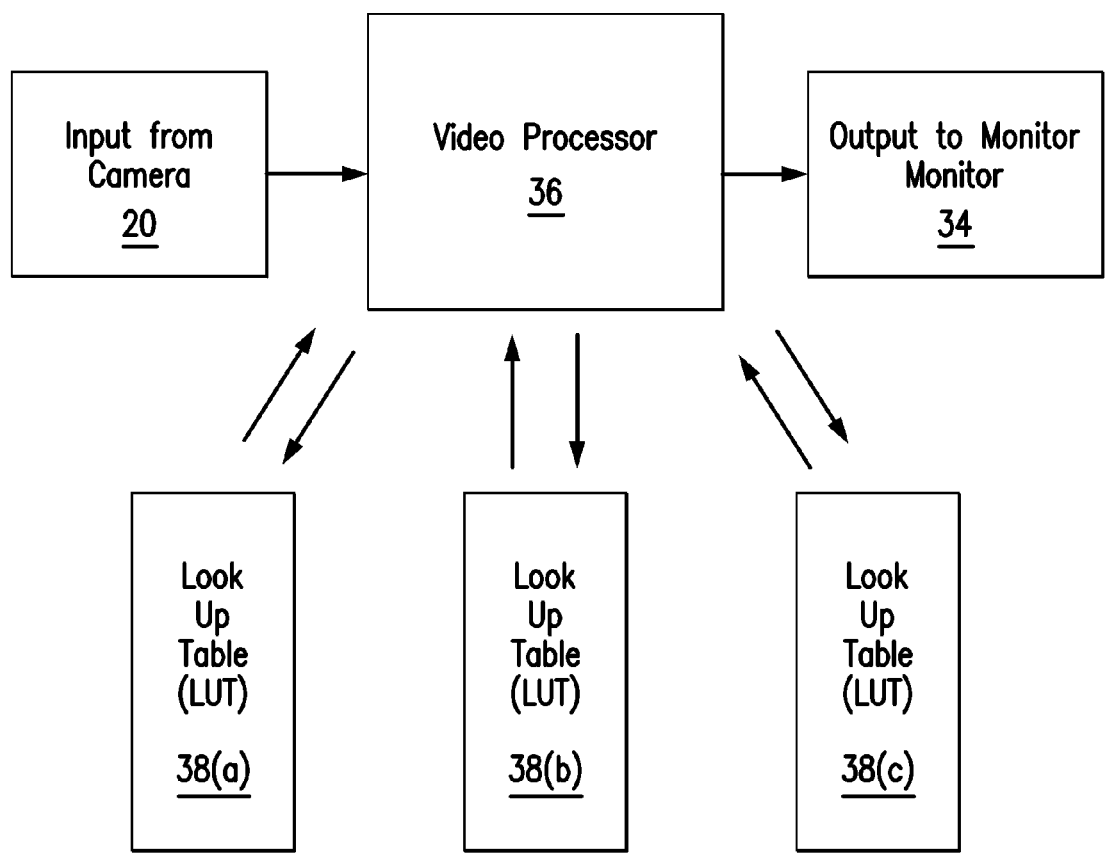
FIG. 6 is an illustration of an additional embodiment of the present disclosure.

FIG. 5 is a flow chart illustrating the steps associated with the present method of video signal processing. As noted, the method is carried out using: a camera; a microprocessor with an associated look-up table; and a monitor. One of the objectives of the method is to process the video signal in a manner that allows the resulting image to be more easily viewed by a blind or low-vision user.

In the first step, the camera is directed toward an object to be viewed. This can be any of a variety of objects the user wishes to examine. The object can be placed underneath the camera or the camera can be pointed to a remote object. The camera then generates a video signal corresponding to the recorded image. This video signal comprises a series of sequential video frames. In the preferred embodiment, the image resolution is chosen to match the monitor being employed. Each of the individual video frames, in turn, comprises an array of individual pixels or picture elements. The number of pixels is a function of the underlying image resolution. For example, each frame may include a width of 1024 pixels and a height of 768 pixels. The video signal is next delivered to a video processor.

The signal is then processed by the microprocessor and in accordance with pre-established instructions from the look-up table. In one possible, embodiment, the look-up table specifies portions of the array to be shaded and the degree of shading to be applied. Preferably the degree of shading is such that the underlying image is not masked. By not completely masking the underlying image, the user is able to maintain spatial awareness of the object being displayed. As noted in FIG. 3, the shaded portions of the array function to highlight the non-shaded portions of the array and thereby facilitate viewing by the low-vision user. The shaded portions can be arranged either vertically or horizontally depending upon the preferences of the user.

The processed video signal is next delivered to the monitor to be displayed. Because the microprocessor processes the video on a pixel by pixel basis the use of an image store, such as a frame buffer, is eliminated. This, in turn, greatly reduces latency.

In an alternative embodiment of the present invention, the system utilizes a number of different look up tables (38(a), 38(b), and 38(c)). Each of these look up tables contains instructions for one pre-determined visual characteristic to be applied to the underlying image. For example, table 38(a) may contain instructions for shading portions of the array, table 38(b) may contain instructions for various color contrasting to be applied to the image and the background, and table 38(c) may contain instructions for positioning the object within the frame.

Although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A method for processing a video signal, the method employing a camera, a microprocessor with an associated look-up table, and a monitor, the method adapted for used by a user with low vision, the method comprising the following steps:
    directing the camera toward an object to be viewed, the camera generating a video signal, the video signal comprising a series of video frames, with each frame comprising an array of pixels;
    delivering the video signal to the microprocessor;
    processing the video signal via the microprocessor in accordance with instructions from the look-up table, the look-up table specifying portions of the array to be shaded and the degree of shading to be applied, with the degree of shading being such that the underlying image is not masked, wherein the shaded portions of the array function to highlight the non-shaded portions of the array and thereby facilitate viewing by the low-vision user;
    delivering the processed video signal to the monitor for viewing by the low-vision user, wherein the microprocessor processes the video on a pixel by pixel basis thereby eliminating the need for a frame buffer such that latency is reduced.

2. A method for processing a video signal, the method employing a camera, a microprocessor with an associated look-up table, and a monitor, the method comprising the following steps:
    viewing an object with the camera and generating a corresponding video signal, the video signal comprising a frame consisting of an array of pixels;
    processing the video signal in accordance with instructions from the look-up table, via the microprocessor to apply a pre-determined visual characteristic to the frame, the look-up table specifying portions of the array to be shaded and the degree of shading to be applied, with the degree of shading being such that the underlying image is not masked, wherein the shaded portions of the array function to highlight the non-shaded portions of the array and thereby facilitate viewing by the low-vision user, the processing being done on a pixel by pixel basis, thereby eliminating the need for the frame to be stored in a video buffer;
    delivering the processed video signal to the monitor for viewing.

3. The method as described in claim 2 wherein the pre-determined visual characteristic is a color contrast between the object and the background.

4. The method as described in claim 2 wherein the pre-determined visual characteristic facilitates viewing by a low-vision user.

5. A system for processing a video signal comprising:
    a camera for viewing an object and generating a corresponding video signal, the video signal comprising a frame made up of an array of pixels;
    a microprocessor and an associated look-up table for processing the video signal, the processing applying shading to the frame, the processing being carried out on a pixel by pixel basis to highlight the non-shaded portions of the array and thereby facilitate viewing by the low-vision user, thereby eliminating the need for the frames to be stored in a video buffer;
    a monitor for displaying the video signal with the pre-determined visual characteristic.

6. A method for processing a video signal, the method employing a camera, a microprocessor, and a monitor, the method comprising the following steps:
    viewing an object with the camera and generating a corresponding video signal, the video signal comprising a frame consisting of an array of pixels and processed via instructions stored in a look-up table specifying portions of the array to be shaded and the degree of shading to be applied such that the underlying image is not masked, and wherein the shaded portions of the array function to highlight the non-shaded portions of the array, the non-shaded portions of the array extending vertically;
    processing the video signal via the microprocessor to apply a pre-determined visual characteristic to the frame, the processing being done on a pixel by pixel basis, thereby eliminating the need for the frame to be stored in a video buffer;
    delivering the processed video signal to the monitor for viewing.

7. A method for processing a video signal, the method employing a camera, a microprocessor, and a monitor, the method comprising the following steps:
    viewing an object with the camera and generating a corresponding video signal, the video signal comprising a frame consisting of an array of pixels and processed via instructions stored in a look-up table specifying portions of the array to be shaded and the degree of shading to be applied such that the underlying image is not masked, and wherein the shaded portions of the array function to highlight the non-shaded portions of the array, the non-shaded portions of the array extending horizontally;
    processing the video signal via the microprocessor to apply a pre-determined visual characteristic to the frame, the processing being done on a pixel by pixel basis, thereby eliminating the need for the frame to be stored in a video buffer;

delivering the processed video signal to the monitor for viewing.

* * * * *